INVENTOR.
Frederick H. MacLaren

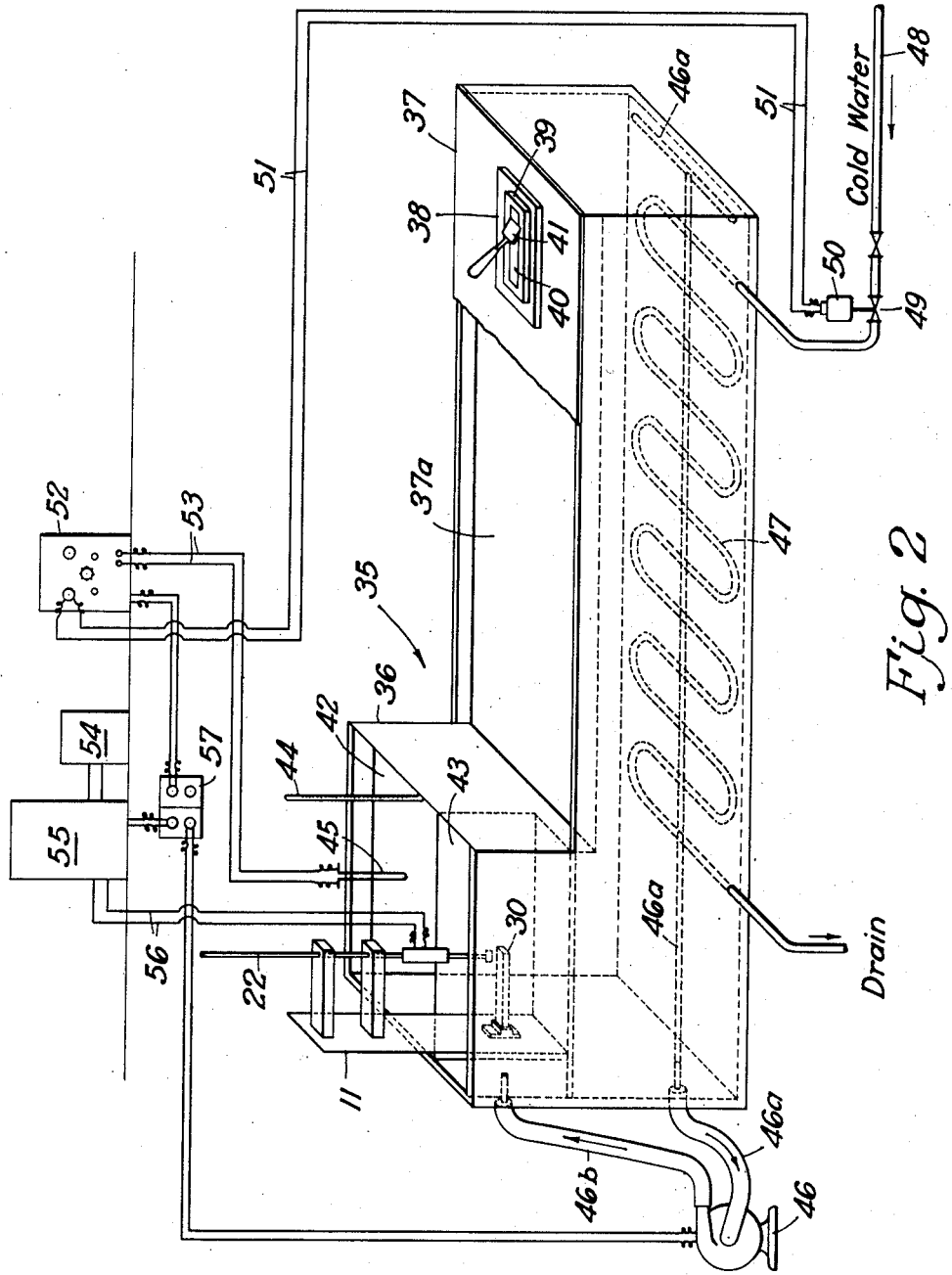

July 21, 1953     F. H. MacLAREN     2,645,932
TESTING OF PLASTIC FLOW

Filed July 30, 1949     5 Sheets-Sheet 5

INVENTOR.
Frederick H. MacLaren
BY
Donald E. Payne
ATTORNEY

Patented July 21, 1953

2,645,932

UNITED STATES PATENT OFFICE 2,645,932

TESTING OF PLASTIC FLOW

Frederick H. MacLaren, Munster, Ind., assignor to Standard Oil Company, Chicago, Ill., a corporation of Indiana Application July 30, 1949, Serial No. 107,722

10 Claims. (Cl. 73—15.6)

This invention relates to an improved means for the testing of plastic flow, particularly as applied to paraffin wax for determining its quality and evaluating its blocking resistance, sealing strength, etc. as well as providing an accurate measure of its apparent oil content.

More than 80% of all refined paraffin wax is marketed in "wet-waxed" surface coating. In the preparation of wet-waxed papers, the paper is coated with wax in machines designed to apply a film of uniform thickness to each side of the paper, which is then chilled on a cold roll or in a water bath. In order that the film of wax on the paper may remain free of surface damage resulting from the handling and storage of the waxed paper in large rolls or heavy stacks of sheets, the wax must have good resistance to "blocking," which term is used to describe the sticking together of individual sheets of waxed paper such that in extreme cases a stack of sheets becomes a solid block of wax containing layers of paper. In order that heat sealing will produce a strong continuous wax film when the paper is employed for packaging, the paraffin wax must possess adequate sealing strength. An important object of my invention is to provide an improved method and means for testing the paraffin wax which will give an accurate and reproducible quality index with respect to (1) resistance to blocking, and (2) adequate sealing strength in actual commercial use.

A further object of the invention is to provide a means which will give an accurate and reproducible indication of such flow characteristics, bending properties, etc., as will determine the quality of wax for use in waxed-carton liquid containers, such as milk containers, where it is important that the wax shall not break when subjected to bending. A further object is to provide a test for determining the amount of oil in wax which is simpler and more accurate than tests heretofore known. Other objects will become apparent as the detailed description of the invention proceeds.

While it has been recognized that blocking resistance and sealing strength are related in some manner to the structural strength or tensile strength of the wax, and a number of tests have been developed for estimating probable blocking tendencies and sealing strengths (note "Tensile Strength of Paraffin Waxes," Paper Trade Journal, May 1946, pages 1 to 7), none of these tests or test methods have been really adequate because they not only lack the precision necessary for the making of sound deductions with regard to wax quality, but they fail to determine the so-called cold flow properties in conjunction with tensile strength. I have found that for proper testing of wax, it is not only important that the wax samples be carefully prepared (to avoid sources of error in prior tests) but that in the actual testing operation the test bar should be preferably held at one end and loaded at the other, that the loading rate should be an entirely different order of magnitude than that heretofore employed in making tensile strength tests, and that the quality index should be measured as a function of time in seconds to effect breaking of the sample at a standard loading rate and under standard conditions of testing, test bar preparation, etc.

Oil in a wax apparently interferes with the crystal linkages and results in a weakening of the crystal lattice. Wax flow under low load is affected by the oil content of the wax. There has never been a precise definition of "oil" in wax since there has never been a precise method of analytically separating oil from wax. The word "oil" as used herein may be defined as any hydrocarbon which is liquid as the test temperature. It has been shown that n-hexadecane behaves like oil when added to wax, and that n-octadecane behaves somewhat like oil, although it takes about .5% of n-octadecane to show the same effect as the .1% of oil. The test method herein described provides a simple and expeditious method of determining the amount of effective oil in wax which is more reliable than solvent test methods heretofore employed.

The test method comprises briefly freeing a representative wax sample from water, dirt, air and/or extraneous material, pouring in lubricant-free molds to fill molds without overflow, repouring at brief time intervals to insure that the mold is full, with wax extending upwardly from it but not overflowing it, curing the castings, shaving with a sharp tool the excess of wax extending above the top surface of the mold, removing test pieces from the molds, curing the removed test pieces, holding one end of a cured test piece with the cut surface down, applying a load to the other end of the test piece in equal increments in succeeding equal time intervals and accurately measuring the time required for breaking, preferably noting the rate of deflection. For testing ordinary paraffin wax of about 132° F. melting point, the test pieces are ½ inch by ½ inch by 3⅝ inches, and the load on the end of the test piece is increased at a rate of 0.05 pound per second or by ¼ pound increments at 5 second intervals. When test pieces break in 25 seconds or less, additional test pieces are tested with weights of ⅛ pound added at 5 second intervals, the latter test results providing data correlatable with the former for determining the oil content of the wax. Temperatures, time and handling technique are important in all parts of the test. The test sample is cured and tested in a constant temperature water bath. The test operations and procedure will be more clearly understood from the following detailed description thereof.

In the accompanying drawings which form a part of this specification:

Figure 2 is a schematic isometric drawing illustrating the test equipment generally;

While the apparatus of this invention and the described test procedure may be applied to a variety of materials exhibiting plastic flow, my primary purpose is to test paraffin wax, and the invention will, therefore, be described as applied to the testing of an ordinary paraffin wax of about 132° F. melting point. I will first describe the equipment, then set forth in detail the essential procedural steps, and finally point out the value and significance of test data.

Figures 1, 1A:
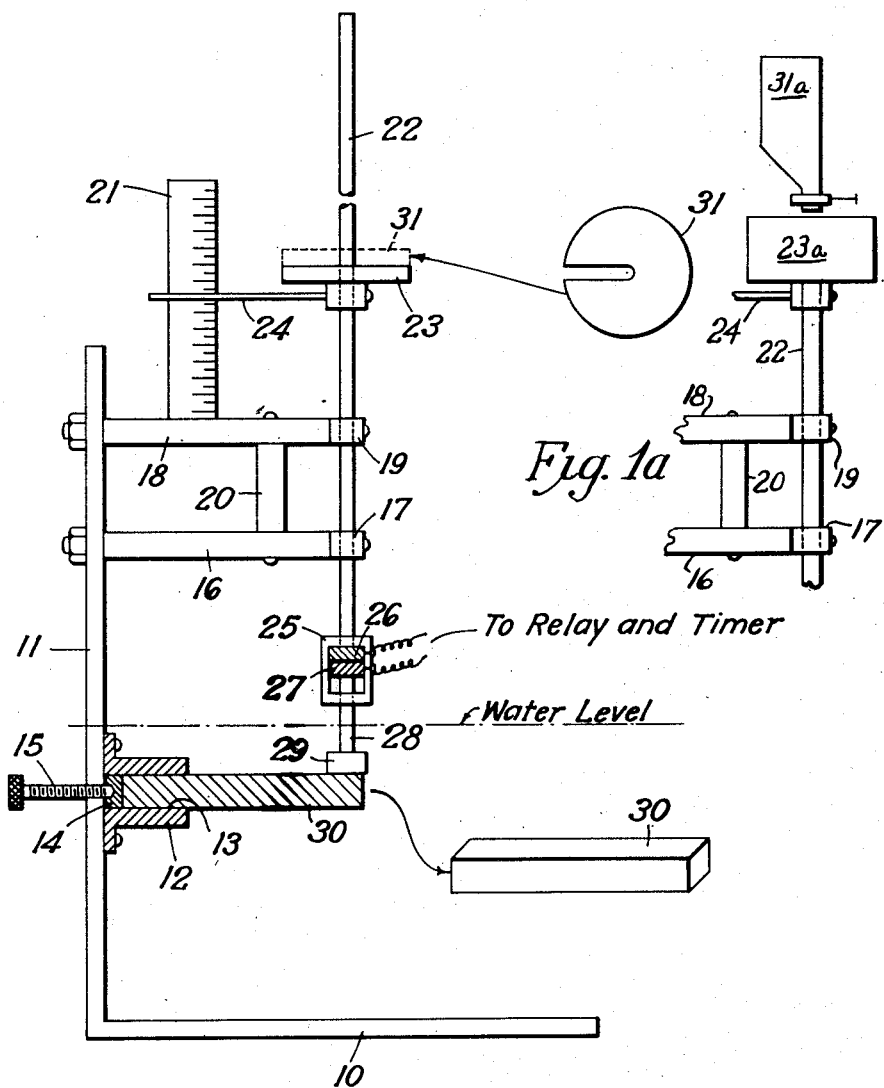
Figure 1 is a schematic drawing of a preferred tester.
Figure 1a is a fragmentary view illustrating one form of loader.

The tester itself, as shown in Figure 1, comprises a base 10 carrying an upright support 11 at the lower part of which is secured the specimen holder 12. This specimen holder or holding jig is provided with a square opening 13 which is ½ inch by ½ inch in cross section and 1 inch deep. At the back of this opening, I provide a square follower 14 secured to a plunger rod 15 which extends through an opening in the back of the jig 12 and support 11 and which provides a means for ejecting any wax which remains in the opening after the completion of the test. About 4 inches above the jig, I provide a transverse support 16 having a bearing 17 at its outer end and about 2 inches higher I provide a second transverse support 18 having a bearing 19 at its outer end, the two transverse supports being held in rigid position by brace 20. Extending upwardly from transverse support 18 is a scale 21. Instead of employing support bearings 17 and 19, I may, of course, employ a single elongated bearing extending between the two transverse supports and serving as a brace therefor.

A vertical aluminum spindle 22 slides freely within bearings 17 and 19. At its upper end, spindle 22 carries a weight platform 23 and a pointer 24 which moves vertically along scale 21. At the lower end of spindle 22 is a yoke 25, preferably fabricated of Lucite, containing a fixed switch element 26 and a movable switch element 27, the latter being vertically movable within the yoke and secured to spindle 28 which extends through an opening in the bottom of the yoke and which has secured at its base a bearing member 29 slightly larger than ½ inch square which rests on the outer end of a wax test bar 30 when the inner end of said test bar is inserted in the jig. This provides a cantilever test beam with an effective length of about 2½ inches and with a cross section of ½ inch by ½ inch.

Weights 31, which in this case are ¼ pound each, may be placed on platform 23 at periodic time intervals of 5 seconds. In other modifications, ⅜ pound weights may be employed at 5 second intervals, or 1/20 pound weights may be added at 1 second intervals. Instead of manually adding weights to the platform, it should be understood, of course, that the gradual increase of weight loading per unit of time may be effected by making platform 23 in the form of a receptacle 23a and adding water, sand or shot either periodically or at a uniform rate from a hopper 31a as shown in Figure 1a. A chain-o-matic balance system may be employed or other known means may be used to obtain an increase in load on the end of the cantilever test beam, either uniformly or at periodic time intervals.

The tester hereinabove described is operated with the test bar 30 submerged in a constant temperature water bath. A preferred general apparatus assembly is illustrated in Figure 2 and it comprises an L-shaped, constant temperature water bath assembly 35 with the water level maintained sufficiently high in the upwardly extending portion 36 of the vessel so that the flat top 37 of the shallow part of the vessel is constantly in actual contact with water, and hence maintained at water bath temperature. Polished steel plates 38 are positioned on upper surface 37 of the water bath to serve as a base for stainless steel molds 39 with a marking at one end. The molds are ½ inch thick with openings 40 which are ½ inch by 3⅝ inches. A lid or cover is preferably provided to fit over the molds positioned on flat top 37 to prevent heat transfer to the molds from surrounding atmosphere. After all of the wax has been poured and set in the molds, the excess is scraped from the top of the test pieces by a sharp edged tool 41.

The upwardly extending portion 36 of vessel 35 is preferably divided into one or more test specimen curing compartments 42 and a tester compartment 43. Between curing compartment 42 and the side wall is a space for thermometer 44 and temperature control element 45. The walls and bottoms of compartments 42 and 43 are provided with large openings or constructed of open mesh material so that water may circulate freely throughout the various compartments. Water circulation is effected by means of pump 46 which picks up water from the lower-most part of the vessel through suction tube 46a and continuously circulates it into the upper part of the vessel through tube 46b. The temperature of the water bath is preferably held within 0.1° F. of 70° F. by circulating cooler water in heat exchanger coil 47 (which may be a copper coil about ¼ inch in diameter), said water being introduced through line 48 at about 45° to 55° F. in amounts controlled by valve 49, the operation of which is controlled by solenoid 50 connected my wires 51 to relay 52 which in turn is connected by wires 53 to the temperature control element 45. The temperature control element may be a bi-metal thermo-regulator, but more accurate control may be effected by an electronic temperature control device as described, for example in "Handbook of Industrial Electronic Circuits," page 228.

The tester hereinabove described in connection with Figure 1 is either fixedly or removably placed in compartment 43 so that the circulating constant temperature water is above the level of the test bar. An electric clock 54 or timing device is connected to relay 55 which is connected by wires 56 to switch elements 26 and 27, so that the relay starts the timer when switches 26—27 is closed and stops it when the switch is opened. Relays 52 and 55 as well as the motor for pump 46 are connected to a 110 volt alternating current power source 57.

When the test piece is first positioned, spindle 22 is held up sufficiently high so that switch 26—27 is open. When the spindle assembly is allowed to rest on the end of the test bar, the circuit is closed by switch 26—27 and the timer begins to operate. Readings are periodically taken on scale 21 as the outer end of the test specimen bends downwardly. When the test specimen breaks, the weight of bearing member 29 opens switch 26—27 and immediately stops the timer. It will be understood, of course, that if the load is applied by introducing liquid, sand, shot, etc., an additional relay (not shown) may be employed to stop the introduction of the liquid or shot, which in this case would constitute the weight load.

From the procedural standpoint, the preparation of the initial test bar or test specimen is of considerable importance. A representative sample of wax to be tested is melted at a temperature of less than 180° F., thoroughly stirred, and then filtered through fluted filter paper to remove water, dirt, etc. The filtered sample in a clean beaker is then rapidly heated on a hot plate to a temperature of 235° F., being vigorously stirred during the heating step with a thermometer employed to determine its temperature. When its temperature reaches 235° F., the beaker is removed, a few drops of the sample are poured to wet the lip of the beaker and the sample is gently swirled in the beaker for a few seconds to effect deaeration. Thereafter, the hot sample is immediately poured into the molds which previously have been thoroughly cleaned to remove all traces of oil or solvent (preferably by use of hot water and rubbing while hot with a dry towel) and held for at least a half hour on the flat top 37 of the water bath under a lid so that the molds are at a uniform temperature of 70° F.

After filling the required number of molds (usually 3) the beaker with the sample is placed on a low heat hot plate for about one minute to keep the wax at a temperature between 200° and 235° F. After about one minute, when skin formation is noted on the castings, additional wax is poured on the top of each casting to fill the cavity produced by shrinkage. This repouring, after an approximate one minute interval, may be repeated and in some cases three repours may be required, all of which should be accomplished within 5 minutes of the initial pouring. The sample should be swirled when not actually pouring and the wax on the lip of the beaker should always be liquid during pouring, the lip of the beaker being heated for a few seconds to melt any wax which might crystallize thereon.

After the castings have cured for one hour in their original position on the upper face 37 of the water bath vessel with the lid on, each mold and plate is removed from surface 37 and the sharp edged cutting tool 41 is employed to shave off the excess wax which projects above the top of the mold; it is important that the tool edge be sharp and flat so that the wax in the mold is not damaged or gouged. The numbered mold end is called the top of the mold and both pouring and trimming should preferably be effected from the bottom toward the top. After trimming, a marking is affixed to the shaved end surface for identification.

The test pieces are removed from the molds and plates by gently tapping the molds with a plastic hammer which loosens the mold from the plate, then by inverting the mold (bottom side up) and further tapping to loosen the test bar. Thereafter by gently pressing from the bottom up with the pads (not nails) of the fingers, the test piece is readily removed. Hand contact with the sides of the test piece should be avoided. The removed test piece is immediately placed in one of the compartments 42 so that the trimmed side thereof faces the surface of the water in the bath.

The sample should be submerged in water in the constant temperature bath for at least one and one-half (1½) hours before testing.

The test is made by removing a test piece from compartment 42 and immediately inserted in opening 13 of holding jig 12 so that the marked end of the cut surface comes under the bearing member 29 and faces downwardly (the casting surface formed on the plate will thus face up). With the timer set at 0.0 second, spindle 22 is gently lowered until switch element 26 contacts element 27 which closes the relay circuit to start timer 50. The initial weight of the spindle assembly is ¼ pound. After 5 seconds, a ¼ pound weight is added to platform 23 with care being taken to avoid any dropping of the weight on to the platform or bumping of weight against the spindle. Similarly, additional ¼ pound weights are added at 5 second intervals. The reading of indicator 24 on meter 21 may be made at any desired time intervals and it should be understood that other known means may be employed for measuring deflection with time. Where greater accuracy is required, conventional "electric eye" equipment comprising a light source, mirror, light beam receiver (photoelectric cell) and electronic amplifier may be employed. Preferably the deflection readings are taken immediately prior to adding each additional weight, i. e. at 5 second intervals.

When the specimen breaks, the falling of bearing element 29 opens switch 26—27 which opens the relay circuit to stop the timer. The recorded time in seconds (usually an average of three tests) is the so-called "index" number of the particular wax which is being tested. If the index number is below 26, the test may be repeated with ⅛ pound weights instead of ¼ pound weights, and the number of seconds indicated by the timer (here again, an average of three tests) is referred to as the "index by modified test." It will be understood, of course, that the timer may be started and stopped in accordance with relative movement between the spindle 22 and bearing member 29 by mechanical, pneumatic, hydraulic or other means instead of the illustrated electrical means, but the latter has been found to be most advantageous.

A feature of the invention is the remarkable reproducibility that results even when tests are performed by different operators and/or in different laboratories. Referring to tests heretofore used, such as the Perkins test and the modified Tinius-Olsen test, reproducibility was considered adequate with differences in test results as high as 10%; in my test the differences in results usually do not exceed 2%. The erratic results frequently encountered in prior test methods were due in part to the effect of cut surfaces of the specimen, strains and torsional effects of the specimen during testing, and particularly the rapid rate of load application; in my test the effect of cut surface has been minimized, torsional effects have been avoided, and the loading rate is employed which is of an entirely different order of magnitude than heretofore used. The index obtained in accordance with my tests is not, strictly speaking, a tensile strength measurement, but is rather a measurement of breaking strength which takes into account the flow properties of the wax undergoing test. The tensile strength in pounds per square inch according to my test is approximately six times the numerical value of the index.

Figure 3:
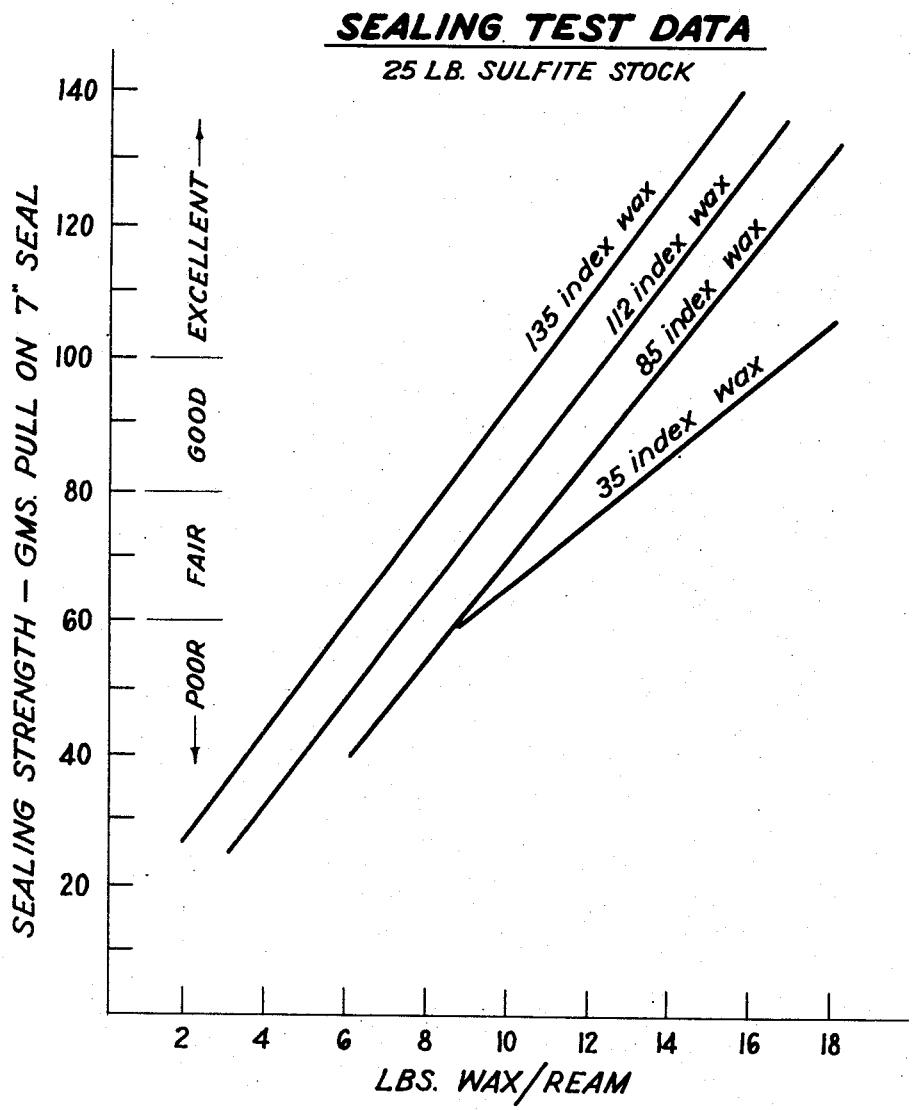
Figure 3 is a chart showing the application of the test results to sealing strength.

Figure 3 illustrates the effectiveness of my tester for evaluating sealing strength, the data in this case showing the number of pounds of wax per ream required to obtain various sealing strengths. This chart shows, for example, that to obtain a good sealing strength of about 90 grams pull on the 7 inch seal, only 10 pounds of wax per ream are required for a 135 index wax, about 11½ pounds per ream are required for 112 index wax, and about 15 pounds of wax per ream is required for a 35 index wax.

Figure 4:
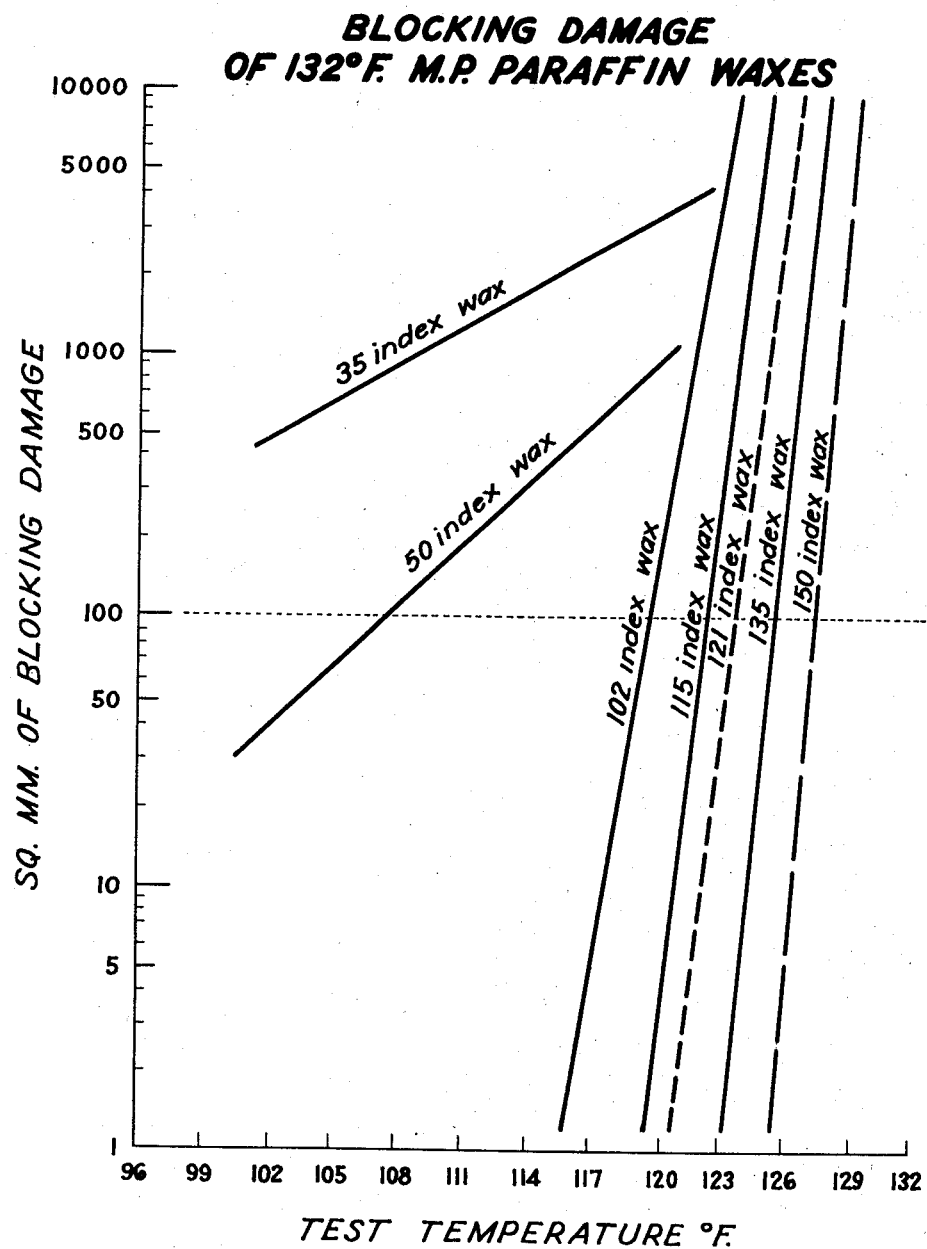
Figure 4 is a chart showing the application of the test results to blocking resistance.

The effectiveness of the test for indicating resistance to blocking is shown in Figure 4 in which square millimeters of blocking damage are plotted against the test temperature for waxes of various index number. For practical purposes, damages of the order of 100 square millimeters are not excessive and it will be seen from the chart that excessive blocking damage occurs with 50 index wax at temperatures above about 109° F., that with 100 index wax, excessive blocking does not occur until the temperature exceeds 118° F. and that with 150 index wax, excessive blocking does not occur at temperatures as high as 128° F. The above test data are all on 132° F. melting point paraffin wax; for a wax of a given index, higher melting point waxes will withstand higher maximum temperatures without blocking damage.

Figure 5:
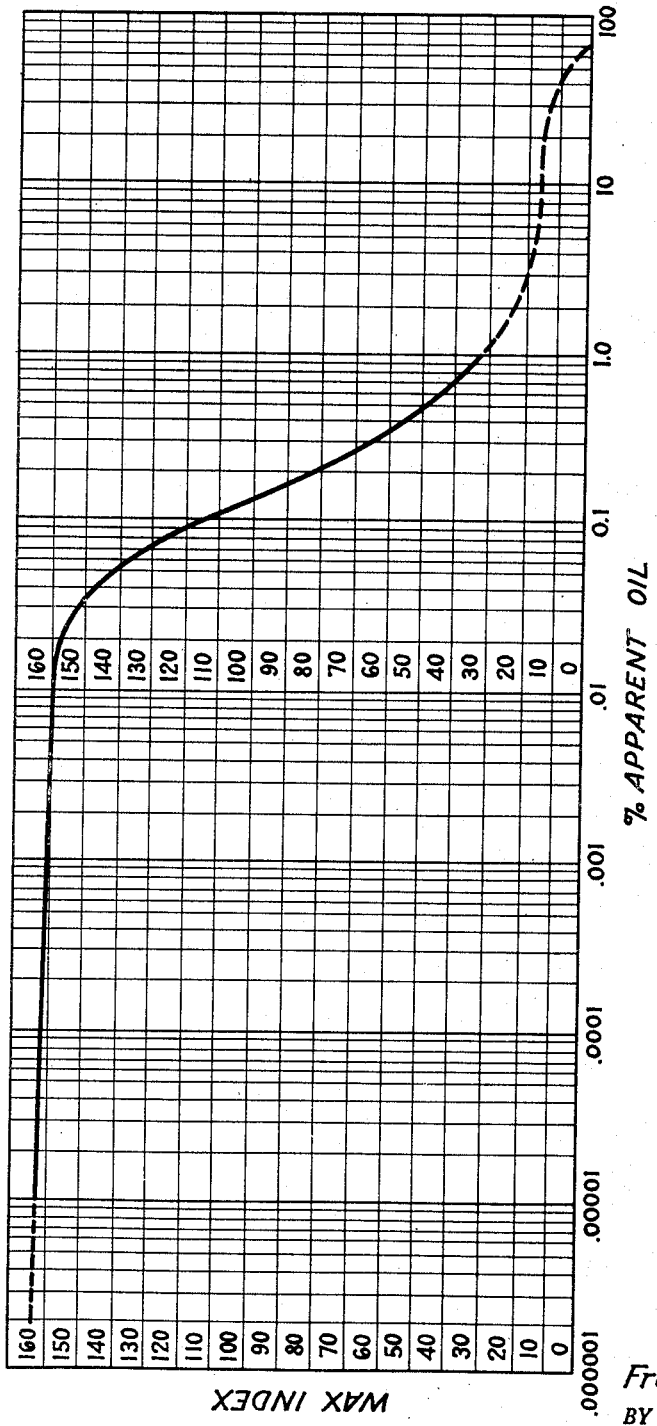
Figure 5 is a chart showing the application of the test results to apparent oil content.

The correlation of the index obtained by my test procedure with the per cent of the apparent oil contained is shown in Figure 5. The term "apparent" oil is employed because the oil contents in many cases do not check with those derived from solvent test methods. However, extensive experience has shown that this method of determining the oil content of wax is more reliable and of more significance than test methods heretofore employed for that purpose. The viscosity of the added oil does not have a pronounced effect.

I claim:

1. Test apparatus which comprises a jig for holding one end of a horizontally disposed test bar, a bearing supported at a higher level than said jig and in substantial alignment with the unsupported end of said test bar, a first spindle loosely slideable in said bearing, a loader for applying increasing loads on the first spindle, a second spindle in substantial alignment with the first spindle and having at its base a bearing surface designed to rest on the unsupported end of the test bar, a loose coupling between said spindles to provide movement of one relative to the other and a timer started and stopped in accordance with said relative movement.

2. The apparatus of claim 1 wherein the loose coupling comprises a yoke secured to the first spindle, an electrical contact element fixed to said yoke, a second electrical contact fixed to said second spindle which is movable in said yoke, an electrical relay, electrical connections between said contacts and said relay and connections between said relay and said timer for starting said timer when the contact element fixed to the yoke bears against the contact fixed to the second spindle and stopping the timer when the second spindle drops and said contacts are disengaged.

3. The apparatus of claim 1 which includes a weight platform mounted on the upper part of said spindle for receiving substantially equal weight increments at equal time intervals.

4. Test apparatus which comprises an L-shaped receptacle one leg thereof being horizontal and serving as a base, with a flat top extending thereover, the other leg thereof being vertical and open at its upper portion so that when the water level is above the flat top said top will be in direct contact with water, a pump and pump connections for maintaining water in the receptacle in constant circulation, a thermo-regulator and a heat exchanger controlled thereby for maintaining the circulating water at a constant temperature, a curing compartment for test bars in one section of the vertical leg portion of the receptacle and a tester for said test bars in another section of the vertical leg portion of the receptacle whereby the test bars are immersed in the circulating constant temperature water bath while they are being tested.

5. A test apparatus which comprises an L-shaped vessel with a flat top surface above its lower extending portion, means for circulating water in said vessel while maintaining a water level substantially above said flat top surface, means for holding the temperature of said circulating water within about .1° of 70° F., means for preparing test bars including compartment means in the upper part of the vessel for curing test samples and means for testing cured samples in another compartment in the upper part of said vessel.

6. The apparatus of claim 5 wherein the testing means comprises a jig for holding one end of a test bar, means for applying equal increments of load at equal increments of time at the unsupported end of the test bar and means for determining the time required to break the test bar after initial loading thereof.

7. The apparatus of claim 6 which includes scale and pointer means for indicating the deflection of the unsupported end of the test bar during the test operation.

8. Test apparatus which comprises a vertical support, a jig secured to the lower part of said vertical support for holding one end of a horizontally disposed test bar, a transverse support secured to the vertical support, a vertical bearing carried by said transverse support in substantial alignment with the unsupported end of the test bar, a spindle designed to slide freely in said bearing, means for applying weight increments at equal time intervals to the upper part of the spindle, a bearing member slidably connected to said spindle and designed to rest on the unsupported end of the test bar, a timing means and, means operated by movement of said bearing member in one direction on said spindle for initiating operation of the timing means when the weight of the spindle is applied to the bearing surface and for stopping said timing means when the bearing surface drops because of the breakage of the test bar.

9. The apparatus of claim 8 which includes a means for indicating the deflection of the unsupported end of the test bar during the course of the testing of said bar.

10. A test apparatus which comprises a constant temperature bath means, means within said bath for securing a test bar by only one end as a cantilever beams, a vertical bearing supported above the bar in substantial alignment with the unsupported end thereof, a spindle means slidable in said bearing, means for incrementally applying a weight load to the said spindle means, a foot member movably connected to the bottom of the spindle means adapted to bear on the unsupported end of the test bar, a timer, and means for stopping and starting said timer by relative motion between said spindle means and said foot member.

FREDERICK H. MacLAREN.

References Cited in the file of this patent

UNITED STATES PATENTS

| Number | Name | Date |
|---|---|---|
| 534,994 | Buzby | Mar. 5, 1895 |
| 989,471 | Abraham | Apr. 11, 1911 |
| 1,763,400 | Lewis | June 10, 1930 |
| 1,827,805 | Watts | Oct. 20, 1931 |
| 2,185,340 | Howe | Jan. 2, 1940 |
| 2,252,464 | Kearns et al. | Aug. 12, 1941 |
| 2,259,491 | Roller | Oct. 21, 1941 |
| 2,283,730 | Gardner | May 19, 1942 |
| 2,293,488 | Bays | Aug. 18, 1942 |
| 2,479,984 | Stock | Aug. 23, 1949 |
| 2,504,985 | Kallas et al. | Apr. 25, 1950 |
| 2,510,952 | Brewster | June 31, 1950 |